UNITED STATES PATENT OFFICE.

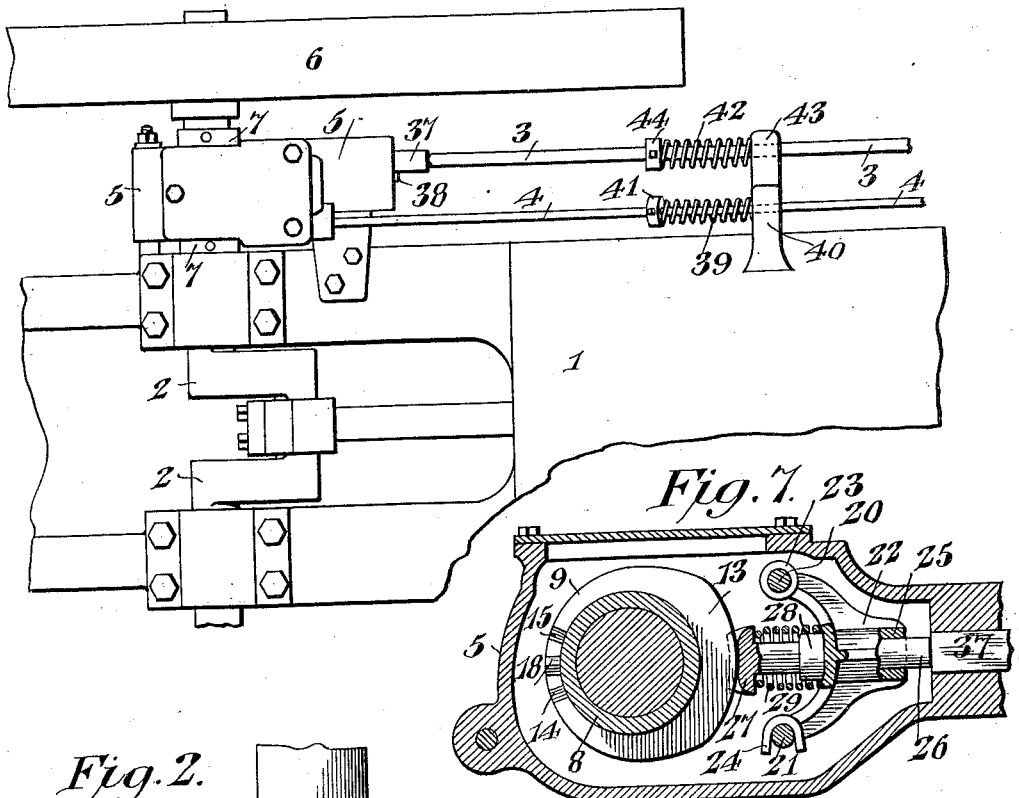
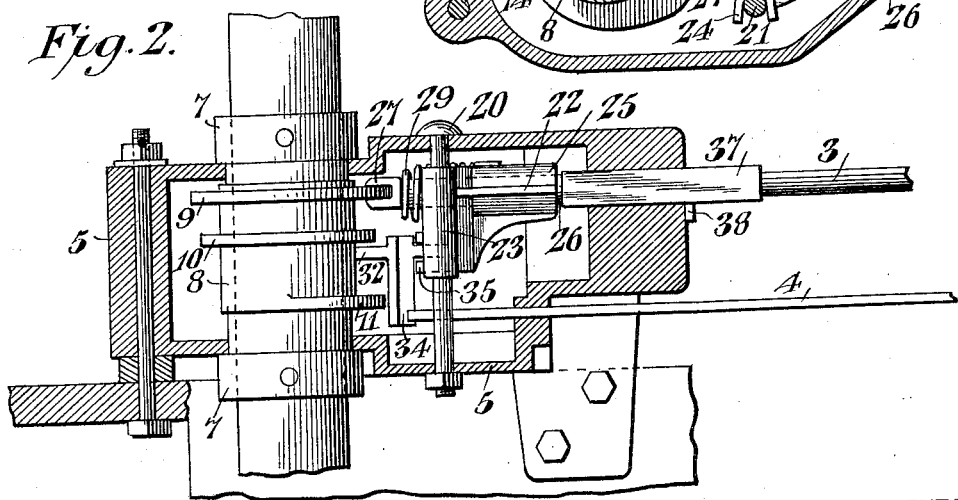

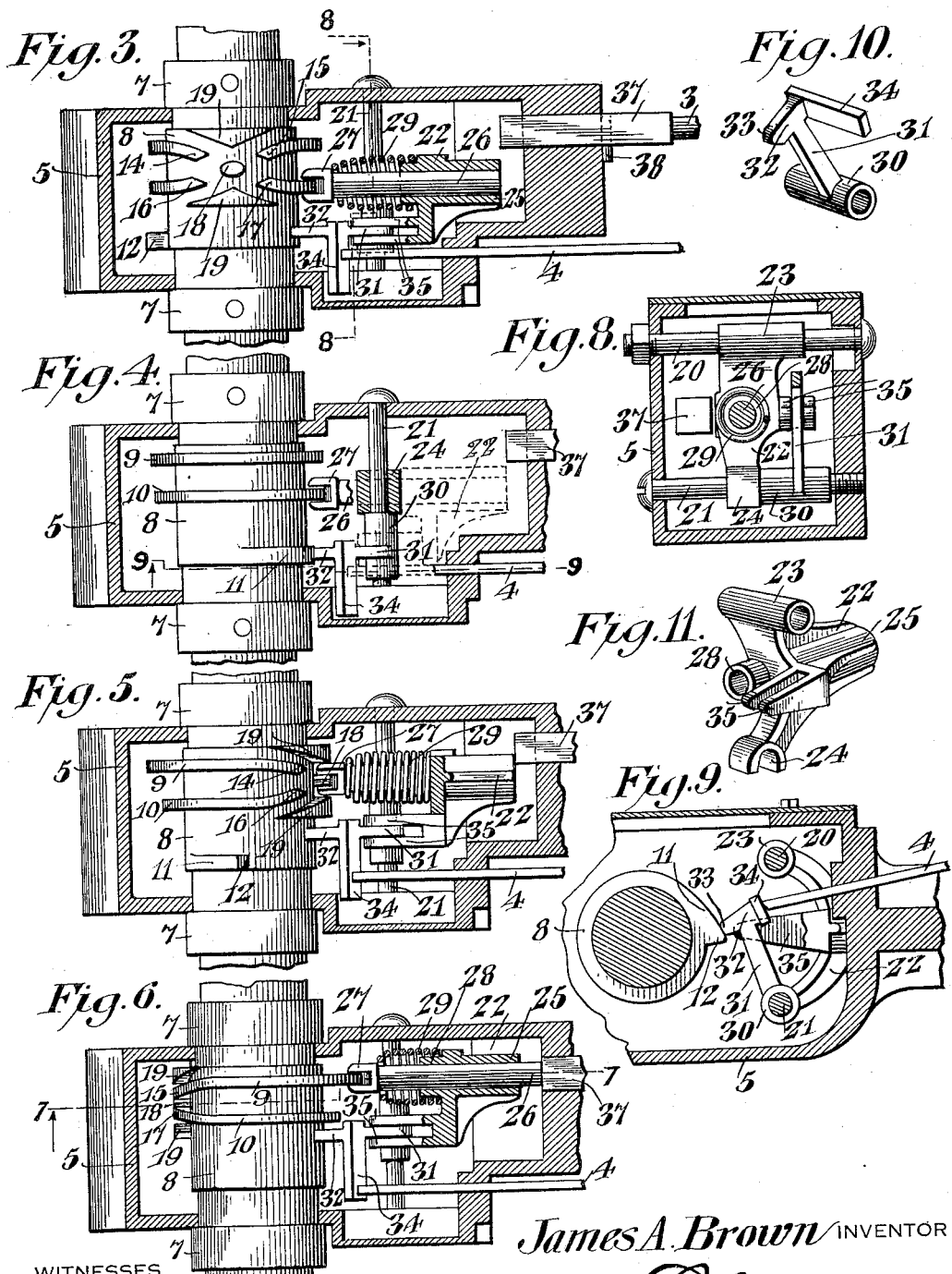

JAMES ANDREW BROWN, OF CEDAR RAPIDS, IOWA, ASSIGNOR TO W. F. COX, OF CEDAR RAPIDS, IOWA.

VALVE-ACTUATING GEAR FOR EXPLOSION-ENGINES.

1,102,717.  Specification of Letters Patent.  Patented July 7, 1914.

Application filed March 5, 1913. Serial No. 752,133.

*To all whom it may concern:*

Be it known that I, JAMES A. BROWN, a citizen of the United States, residing at Cedar Rapids, in the county of Linn and State of Iowa, have invented a new and useful Valve-Actuating Gear for Explosion-Engines, of which the following is a specification.

This invention has reference to improvements in valve actuating gear for explosion engines, and is designed to provide a simple device for the purpose which will avoid the possibility of derangement of the timing of the parts in the event of the removal and replacing of parts, and which in a four cycle engine obviates the employment of a half speed gear wheel or shaft or other half speed device of like character.

In accordance with the present invention there is mounted directly upon the main or crank shaft of the engine a cam structure capable of directly actuating the exhaust valve and sparking devices customarily employed in four cycle engines in such timed relation that two revolutions of the crank shaft are needed for each device to be actuated, and the cam structure is so arranged that during one revolution of the crank shaft one of the actuating members is moved actively while the other remains passive, and the order of actuation is reversed during the next revolution of the crank shaft.

The invention will be best understood from a consideration of the following detailed description taken in connection with the accompanying drawings forming a part of this specification, with the further understanding that while the drawings show a practical embodiment of the invention, the latter is not confined to any strict conformity with the showing of the drawing, but may be changed and modified so long as such changes and modifications mark no material departure from the salient features of the invention.

In the drawings:—Figure 1 is a plan view of a portion of the explosion engine showing the invention applied. Fig. 2 is a section in different planes extending in the same general direction as the direction of reciprocation of the engine piston and taken through the casing for the valve operating structure, some parts being shown in elevation. Figs. 3, 4, 5 and 6 are sections similar to that of Fig. 2, but showing different phases of operation. Fig. 7 is a section on the line 7—7 of Fig. 6. Fig. 8 is a section on the line 8—8 of Fig. 3. Fig. 9 is a section on the line 9—9 of Fig. 4 with some distant parts omitted. Fig. 10 is a perspective view of a rock arm controlling the sparking mechanism. Fig. 11 is a perspective view of a yoke structure employed in the device.

Referring to the drawings, there is shown an engine 1 which may be considered as typical of any suitable engine structure without confining the practical embodiment of the invention to any particular type of engine. There is also shown a crank shaft 2, a rod 3 for controlling the exhaust valve of the engine, and another rod 4 designed to control the sparking mechanism of the engine.

It is to be considered that the engine shown is of the familiar four cycle type, wherein the exhaust valve is positively opened against the action of a seating spring at the termination of the power stroke and the sparking devices are actuated to ignite the compressed charge at about the completion of the compression stroke. At one side of the crank portion of the engine there is located a casing 5 which may be substantially closed in order that the parts contained within such casing may be appropriately lubricated, it being the custom to practically fill such casings with a lubricant in which the moving parts are immersed. The casing 5 is traversed by a continuation of the crank shaft beyond the corresponding bearing, and the casing 5 is lubricated between such bearing and the fly wheel 6, where a single fly wheel is employed, or one of the fly wheels where two are employed.

The crank shaft 2 extends through suitable openings in opposite walls of the casing 5 and these openings are traversed by collars 7 which serve to substantially fill the openings through which the crank shaft is passed. Mounted on the crank shaft between the collars and within the casing is a sleeve 8 made fast to the crank shaft in an appropirate manner. Formed on the sleeve are two spaced flanges 9, 10, respectively, the flange 9 being near one end of the sleeve 8 and the flange 10 at an intermediate point, while at the end of the sleeve remote from the flange 9 there is provided a cam member 11 which may be in one piece with the sleeve and terminates in an abrupt, substantially radial shoulder 12, the cam gradually rising from the surface of the sleeve as it approaches said shoulder. The flange 9 is radially thickened throughout an appropriate distance, as indicated at 13, thereby forming a cam of an appropriate circumferential extent for a purpose which will presently appear. The flanges 9 and 10 are incomplete circumferentially, and at their terminal portions curve as shown at 14, 15, 16 and 17, respectively, the portions 14 and 15 being separated by an appropriate space and defining the ends of the flange 9, while the terminal portions 16 and 17 are separated by a similar space and defining the terminals of the flange 10. The terminal portions 14 and 16 curve one toward the other and the same is true of the terminal portions 15 and 17, while intermediate of these terminal portions is a lug or boss 18 and on opposite sides of this lug or boss 18 and spaced therefrom in the direction of the longitudinal axis of the sleeve 8 are circumferentially elongated guard lugs 19 in coactive relation with the curved terminal portions of the flanges 9 and 10 and having those edges presented toward the lug 18 conforming to a greater or less extent to the corresponding portions of the terminal parts of the flanges 9 and 10.

Traversing the casing 5 are two spaced rods 20, 21, respectively, which rods may be in the form of bolts or screws for ready placing or removal. Mounted on the rods 20, 21 is a yoke 22 provided with an elongated tubular member 23 traversed by the rod 20 and slidable thereon, and a fork 24 adapted to straddle the rod 21 and slide thereon. The yoke 22 is formed with an elongated tubular bearing member 25 in which there is lodged an elongated shank 26 having at one end a fork-shaped member 27 with the legs thereof so spaced as to straddle either flange 9 or 10. Surrounding the shank 26 between the fork 27 and the corresponding end of the tubular bearing 25 which may be elongated, as indicated at 28, there is a spring 29 at one end seated against the yoke 22 in surrounding relation to the extension 28, and at the other end bearing against the fork 27, the tendency of the spring 29 being to move the shank 26 longitudinally of the bearing 25 and maintain the fork 27 in straddling relation to the flange 9 or 10, as the case may be. The two flanges 9 and 10 serve as guides for the fork 27 and the curved terminal portions of these flanges, together with the lugs 18 and 19, constitute cross over switches causing the fork 27 to pass in alternation at the switch from one flange to the other, the yoke 22 participating in such movement by sliding along the rods 20 and 21, but is held by these rods from any other movement, and this movement of the yoke is parallel with the longitudinal axis of the crank shaft 2, the rods 20 and 21 having such parallel relation with the crank shaft.

Mounted on the rod 21 to slide lengthwise thereof is an elongated bearing member 30 from which there extends an arm 31 in a general radial direction, said arm terminating at the outer end in a head 32 having at one end a nose 33 and at the other end a laterally projecting finger 34. The bearing member 30 together with the arm 31 and parts carried thereby constitute a rock arm and formed on the yoke 22 at one side of the bearing member 25 are two parallel fingers 35 so disposed as to straddle the radial arm 31, wherefore, when the yoke 22 is moved along the rods 20 and 21 the rock arm 31 will participate in such movement. The length of the fingers 35 where straddling the arm 31 is sufficient to permit the requisite rocking of the arm in a manner and for a purpose to be described. The rod 4 controlling the sparking devices passes through and has a slidable bearing 36 in an appropriate part of the casing 5, and engages the finger 34 on the face thereof remote from the nose 33, this finger being flat or plane where engaged by the rod 4, so that the finger may move laterally or at right angles to the length of the rod 4 without moving the finger out of engagement with said rod. The rod 3 controlling the exhaust valve has an extension 37 entering the casing through one end wall thereof, and this extension may be provided with a stop pin 38 limiting the movement of the extension 37 into the casing. This extension 37 when arrested by the stop pin 38 has the end within the casing so related to the end of the yoke 22 remote from the fork 27 that such end of the yoke may move laterally with relation to the extension 37 to bring the corresponding end of the shank 26 in alinement with the extension 37 when the fork 27 is in straddling relation to the flange 9, but when this fork is in engagement with the flange 10, then the shank 26 is to one side of the extension 37 and under these circumstances the nose 33 is in line with the cam 11, but when the fork 27 is in engagement with the flange 9 the nose 33 is on a plain portion of the sleeve 8 to one side of the cam 11.

Suppose, now, that the engine is in operation and that at the instant of consideration the parts be in the position shown in Fig. 2 with the fork 27 leaving the cam 13 and the exhaust valve closed with the suction stroke just beginning. As the rotation of the crank shaft continues for, say, one-half turn, the parts finally assume the position shown in Fig. 3, fork 27 having in the meantime passed on to the terminal part 14 of the flange 9, the shank 26 partially rotating to accommodate the fork to the changing direction of the flange 9, and this fork is of sufficient length to engage the lug or boss 18 before leaving the terminal portion 14, whereupon the fork 27 is guided by the adjacent lug 19 on to the terminal portion 17 of the flange 10 and the fork travels along this flange with such turning movement as is necessary, until it reaches the position shown in Fig. 3. On traversing the switch part of the flanges 9 and 10 the fork with its spindle 26 and the yoke 22 have been moved in a direction parallel with the axis of rotation of the crank shaft, such movement of the yoke being along the guide rods 20 and 21. The fingers 35 being in engagement with the arm 31, said arm, together with the parts connected with it, are moved lengthwise of the rod 21 until the nose 33 is in line with the cam 11. The flange 10 is of equal height throughout and of the same height as the flange 9, except where the latter is radially extended to form the cam 13. The shank 26, therefore, remains quiescent, so far as longitudinal movement is concerned, the fork 27 being held in engagement with the inactive portions of the flanges 9 and 10 by the spring 29. Considering the shaft as making a second half turn, the fork 27 still remains in engagement with the flange 10 which is more than one hundred and eighty degrees in circumferential extent, but in the meantime the cam 11 has engaged the nose 33, and since this cam gradually rises the arm 31 is rocked in a direction away from the crank shaft and the rod 4 engaged by the finger 34 is moved longitudinally in the same direction. This movement continues until the shoulder 12 is reached and the nose 33 snaps back of this shoulder against the plain portion of the sleeve 8 immediately following the shoulder, the movement of the arm 31 in the last-named direction being brought about by a spring 39 surrounding the rod 4 between a guide lug 40 and a stop collar 41, or any other suitable manner, while the rod 3 is held in a normal position by a spring 42 surrounding the rod between a lug 43 and a stop collar 44, or by any other suitable means. The first movement of the crank shaft from the position shown in Fig. 2 to that shown in Fig. 3 resulted in the indrawing of an explosive charge, while the second movement bringing the parts to the position shown in Fig. 4 caused the compression of the charge, and assuming that the nose 33 has left the cam 11 the charge has been fired, so that the crank shaft is now traveling under the impulse imparted by the explosion. While the power stroke is progressing the fork 27 reaches the terminal part 16 of the flange 10 and under the guidance of this curved terminal portion and of the corresponding part of the adjacent lug 19 the fork is directed to the lug or boss 18 and moves over to the flange 9, the yoke 22 together with the arm 31 participating in such movement along the guide rods 20 and 21. This intermediate position showing the switching over of the fork 27 is illustrated in Fig. 5, but the power stroke is not completed until the sleeve 8 has assumed the position shown in Fig. 3, and with the fork 27 in engagement with the flange 9 instead of the flange 10. As soon as the power stroke is completed a further rotation of the shaft 2 causes the return of the piston on the exhaust stroke and the travel of the flange 9 with relation to the fork 27 to an extent to bring the cam 13 into active relation to the fork 27, thus moving the shank 26 longitudinally and compressing the spring 29. At this time, however, the shank 26 is in alinement with the extension 27 of the rod 3 and the movement of the shank brings it into engagement with such extension and the rod 3 is moved in a direction to compress the spring 42 and at the same time open the exhaust valve of the engine in the usual manner, which will be readily understood, although the exhaust valve is not shown in the drawings.

The position of the parts at about midway of the exhaust stroke is shown in Figs. 6 and 7, while the position of the parts at the completion of the exhaust stroke or the beginning of the intake stroke is shown in Fig. 2. Fig. 9 shows the position of the cam 11 with relation to the nose 33 just prior to the release of this nose by the passing of the cam from engagement with it.

What is claimed is:—

1. In an explosion engine, means for actuating the exhaust valve and the igniting devices directly from the crank shaft of the engine, comprising crossed guides on the crank shaft, one of said guides including a cam outstanding with relation to the axis of rotation of the crank shaft and spaced from the crossing of the guides in a direction circumferential of the crank shaft, another cam on and rotating with the crank shaft, a reciprocatory and oscillatory member having means engaged by the crossed guides and by the cam included therein to be oscillated by the guides and reciprocated by the cam, a rockable member in position to be engaged by the second-named cam of the crank shaft to actuate the igniting devices, carrying means for the devices engaged by the cam and guides and mounted for movement in a direction lengthwise of the crank shaft, and means for actuating the exhaust valve of the engine, said means being responsive to a movement of the reciprocatory and oscillatory member when engaged by the cam forming part of the guides.

2. In an explosion engine of the four cycle type, a carrier movable in the direction of the length of the engine shaft, a member on the carrier movable in a direction perpendicular to the length of the shaft, another member controlled by the carrier and movable in a direction perpendicular to the length of the shaft, guides on the shaft for imparting to the carrier and to the parts controlled thereby a movement parallel with the axis of the shaft, said guides including a cam active to the member on the carrier to move the latter perpendicular to the axis of the shaft, a cam on the shaft active to the member engaged by the carrier and movable therewith, and means for transmitting movements of the member on the carrier and the member controlled by the carrier when said members are moved perpendicular to the axis of the shaft for actuating the exhaust valve and igniting mechanism of the engine in timed relation.

3. In an explosion engine of the four cycle type, a carrier movable in the direction of the length of the engine shaft, a member on the carrier movable in a direction perpendicular to the length of the shaft, another member controlled by the carrier and movable in a direction perpendicular to the length of the shaft, guides on the shaft for imparting to the carrier and to the parts controlled thereby a movement parallel with the axis of the shaft, said guides including a cam active to the member on the carrier to move the latter perpendicular to the axis of the shaft, a cam on the shaft active to the member engaged by the carrier and movable therewith, and means for transmitting the movements of the member on the carrier and the member controlled by the carrier when said members are moved perpendicular to the axis of the shaft for actuating the exhaust valve and igniting mechanism of the engine in timed relation; said carrier, guides and cams being provided with a casing adapted to hold lubricant in immersing relation to the moving parts inclosed thereby.

4. In an explosion engine of the four cycle type, a crank shaft provided with axially spaced flanges circumferential of the shaft and incomplete in their continuity and at their ends shaped to constitute a switch-over device, one of said flanges being radially extended to form a cam, another cam on the shaft in axially spaced relation to the flanges, a lubricant receptacle constituting a casing for the flanged portion of the shaft, a carrier mounted in the casing for movement longitudinally of the shaft in parallel relation thereto, a shank or pin mounted in the carrier for oscillation and reciprocation and provided with a fork or guide shoe at one end for engagement with the flanges, a rock arm engaged by the carrier and movable therewith in a direction parallel with the axis of rotation of the crank shaft, said rock arm being provided with a nose movable into and out of the path of the second-named cam, and with a finger elongated in the direction of travel of the carrier, and valve and igniter actuating means entering the casing into the paths of the shank or pin and the elongated finger.

5. In an explosion engine of the four cycle type, a lubricant tight casing in surrounding relation to a portion of the crank shaft of the engine, spaced guide members on the shaft within the casing provided with a cross-over structure, one of said guide members including a radially extended cam, another radially extended cam within the casing and carried by the crank shaft, spaced supporting members within the casing at one side of the crank shaft, a yoke or carrier mounted on said supporting members for movement parallel with the axis of the crank shaft, a shank or pin mounted in the yoke or carrier and provided with a head or guide shoe adapted to the guides on the crank shaft, said shank or pin being provided with a spring for holding it in engagement with the guides and said shank having both longitudinal and rotative movements in the carrier, a slidable rock arm mounted on one of the supporting members for the carrier, said rock arm having an elongated finger and a nose on opposite sides, said nose being movable into and out of active relation to the second cam on the crank shaft, slidable connections between the rock arm and the carrier for the movement of the arm with the carrier parallel to the longitudinal axis of the shaft, and valve and igniter actuating connections in position to be engaged by the shank or pin, and by the finger of the rock arm, the cams on the crank shaft being related to cause timed operations of the igniter mechanism and exhaust valve.

In testimony, that I claim the foregoing as my own, I have hereto affixed my signature in the presence of two witnesses.

JAMES ANDREW BROWN.

Witnesses:
H. STAVES,
WM. FINN.

Copies of this patent may be obtained for five cents each, by addressing the "Commissioner of Patents, Washington, D. C."